(12) United States Patent
Kashima

(10) Patent No.: US 8,301,040 B2
(45) Date of Patent: Oct. 30, 2012

(54) OPTICAL TRANSMISSION SYSTEM USING RAMAN OPTICAL AMPLIFICATION

(75) Inventor: Norio Kashima, Tokyo (JP)

(73) Assignees: Fujikura Ltd., Tokyo (JP); Shibaura Institute of Technology, Tokyo (JP)

( * ) Notice: Subject to any disclaimer, the term of this patent is extended or adjusted under 35 U.S.C. 154(b) by 595 days.

(21) Appl. No.: 12/482,691

(22) Filed: Jun. 11, 2009

(65) Prior Publication Data

US 2009/0324234 A1    Dec. 31, 2009

(30) Foreign Application Priority Data

Jun. 26, 2008  (JP) ................................. 2008-166843

(51) Int. Cl.
*H04B 10/06* (2006.01)
*H04B 10/00* (2006.01)

(52) U.S. Cl. .................. 398/211; 398/169; 398/170

(58) Field of Classification Search ........... 398/169–170
See application file for complete search history.

(56) References Cited

U.S. PATENT DOCUMENTS

| 2002/0105703 | A1* | 8/2002 | Grubb et al. ................. 359/173 |
| 2003/0137720 | A1  | 7/2003 | Onaka et al. |
| 2004/0213574 | A1* | 10/2004 | Han et al. ........................ 398/71 |
| 2005/0132785 | A1  | 6/2005 | Onaka et al. |
| 2006/0083515 | A1* | 4/2006 | Hann et al. ...................... 398/87 |
| 2007/0014574 | A1* | 1/2007 | Yada ............................... 398/71 |
| 2009/0269059 | A1  | 10/2009 | Genay et al. |

FOREIGN PATENT DOCUMENTS

| JP | 2000-196536 A | 7/2000 |
| JP | 2002-207228 A | 7/2002 |
| JP | 2003-143084 A | 5/2003 |
| JP | 2003-218804 A | 7/2003 |
| JP | 2004-222304 A | 8/2004 |
| JP | 2006-165651 A | 6/2006 |
| WO | 2008/009849 A2 | 1/2008 |

OTHER PUBLICATIONS

A. Banerjee et al., "Wavelength-division-multiplexed passive optical network (WDM-PON) technologies for broadband access: a Review", Journal of Optical Networking, Nov. 2005, pp. 737-758, vol. 4, No. 11.
M. N. Islam, "Raman Amplifiers for Telecommunications", IEEE Journal of Selected Topics in Quantum Electronics, May/Jun. 2002, pp. 548-559, vol. 8, No. 3.
Japanese Office Action dated May 29, 2012, issued in corresponding Japanese Patent Application No. 2008-166843, with English translation (7 pages).

* cited by examiner

*Primary Examiner* — Danny Leung
(74) *Attorney, Agent, or Firm* — Westerman, Hattori, Daniels & Adrian, LLP

(57) ABSTRACT

An optical transmission system using Raman optical amplification, which is configured in a WDM-PON topology where a signal light between an optical line terminal and each of optical network units is multi/demultiplexed at a WDM. The optical line terminal supplies continuous lights having wavelengths to the optical network units through an optical fiber from the optical line terminal. The continuous lights are used for an uplink signal. In addition, the optical line terminal outputs a pumping light having a wavelength which is used to excite lights of the continuous lights, to the optical fiber from the optical line terminal.

8 Claims, 3 Drawing Sheets

US 8,301,040 B2

OPTICAL TRANSMISSION SYSTEM USING RAMAN OPTICAL AMPLIFICATION

CROSS-REFERENCE TO RELATED APPLICATION

The present application is based on, and claims priority from, J.P. Application 2008-166843, filed Jun. 26, 2008, the disclosure of which is hereby incorporated by reference herein in its entirety.

BACKGROUND OF THE INVENTION

1. Technical Field

The present invention relates to a technology for configuring high-speed optical transmission and flexible network by using a WDM (wavelength division multiplexer) in an optical access system, and more particularly, to a WDM-PON (passive optical network) as one of the technologies for configuring an optical access system.

2. Background Art

Recently, a WDM-PON for configuring high-speed optical transmission and flexible network by using a WDM in an optical access system have been researched and developed in the world (for example, refer to A. Banerjee, et al., "Wavelength-division-multiplexed passive optical network (WDM-PON) technologies for broadband access: a review", Journal of Optical Networking, Vol. 4, No. 11, pp. 737-758, November 2005 and Japanese Patent Application Laid-Open Publication No. 2004-222304). In the WDM-PON, a PON topology where an optical fiber is branched by an optical splitter is used, and each subscriber premises apparatus (hereinafter, referred to as optical network unit) is allocated with a wavelength for transmission, so that high-speed optical transmission or long-distance optical transmission between a central office apparatus (hereinafter, referred to as optical line terminal) and each optical network unit can be implemented.

As the high-speed optical transmission technology, there are developed various technologies of optical repeating systems (for example, refer to M. N. Islam, "Raman Amplifiers for Telecommunications", IEEE Journal of Selected Topics in Quantum Electronics, Vol. 8, No. 3, pp. 548-559, May/June 2002). Therefore, the high-speed optical transmission technologies of the optical repeating system can be applied to the WDM-PON.

SUMMARY OF THE INVENTION

However, very high cost is needed for applying the high-speed optical transmission technologies of the optical repeating system to the WDM-PON. Therefore, there is a problem in that the high-speed optical transmission technologies of the optical repeating system cannot be easy to apply in an optical access system requiring a high economical efficiency.

In addition, in the optical access system, there is a case where a distance from the optical network unit to the optical line terminal is long or a case where a branch ratio of the optical splitter is large. In this case, if there is a problem in that high-speed transmission of 40 Gbps is performed, there is a problem in that intensities of signal lights are insufficient and a loss budget is lowered. The optical access system which is designed to use about 2.5 Gbps can not be maintained.

Therefore, the present invention is to provide an optical transmission system capable of reducing cost of the WDM-PON and compensating for insufficiency of the intensities of the signal lights.

According to an aspect of the present invention, there is provided an optical transmission system using Raman optical amplification, which is configured to have an optical line terminal, a plurality of optical network units connected to the optical line terminal through an optical fiber, and a WDM (wavelength division multiplexer) which multi/demultiplexes signal lights between the optical line terminal and the optical network units in a WDM-PON (passive optical network) topology, wherein the optical line terminal includes: a continuous light source which supplies to the optical network units through the optical fiber, continuous lights having the same wavelengths as uplink signal lights from the optical network units to the optical line terminal; and a pumping light source which supplies to the optical fiber, pumping lights which are used to excite the continuous lights from the continuous light source, and wherein each of the optical network units includes an external modulator which modulates the continuous lights from the optical line terminal and outputs the modulated continuous lights as the uplink signal lights to the optical line terminal.

Light sources having different oscillation wavelengths are not necessarily provided to the optical network units. By providing an external modulator to each of the optical network units, bi-directional optical communication can be implemented. In addition, since the insufficiency of the intensities of the uplink signal lights can be compensated by performing Raman optical amplification on the continuous light transmitted from the optical line terminal with the pumping lights which are supplied from the optical line terminal, amplifiers are not necessarily provided to the optical network units. By controlling the wavelengths or intensities of the pumping lights, an amplification ratio of each optical network unit can be adjusted. Accordingly, it is possible to reduce cost of the WDM-PON.

In addition, since the wavelengths of the uplink signal light can be defined by using the wavelengths of the continuous lights supplied by the optical line terminal, it is possible to easily manage the wavelengths.

In the above aspect, the optical transmission system using Raman optical amplification preferably further includes a reflection filter which is disposed between the optical line terminal and the WDM to reflect the pumping light transmitted from the optical line terminal.

Accordingly, amplification of the uplink signal as well as amplification of the downward continuous light can be performed. In addition, since the inputting of the pumping lights into the optical network units can be prevented, it is possible to prevent deterioration in a quality of communication. Accordingly, the pumping lights can be used to monitor an optical communication line.

In addition, in the above optical transmission system using Raman optical amplification, the optical line terminal preferably includes a plurality of the pumping light sources, and each of the pumping light sources supplies to the optical fiber the pumping light which are used to excite the continuous lights from the continuous light source.

Since the continuous light is excited by using a plurality of the pumping lights, it is possible to amplify the continuous light with an amplification characteristic which is a composition of gains in a plurality of the Raman optical amplifications. If distances between the optical line terminal and the optical network units are different, optical losses thereof become different from each other. However, it is possible to adjust a required gain by using the composition of the gains of the Raman optical amplifications as the amplification characteristic.

In addition, in the above optical transmission system using Raman optical amplification, the optical line terminal preferably further includes a pumping light controller which monitors the intensities of the uplink signal lights transmitted from the optical network unit and controls the wavelengths or intensities of the pumping lights supplied by the pumping light source so that the intensities of the uplink signal lights become predetermined intensities.

Therefore, it is possible to implement an AGC (automatic gain control) where the gain of the Raman optical amplification can be controllably varied. Accordingly, transmission of the uplink signal light can be maintained in a good state.

EFFECT OF THE INVENTION

According to the present invention, it is possible to provide an optical transmission system capable of reducing cost of a WDM-PON and compensating for insufficiency of intensities of signal lights.

DETAILED DESCRIPTION OF THE INVENTION

Hereinafter, embodiments of the present invention will be described in detail with reference to the accompanying drawings. The embodiments described below are exemplary configurations of the present invention, but the present invention is not limited thereto.

Figure 1:
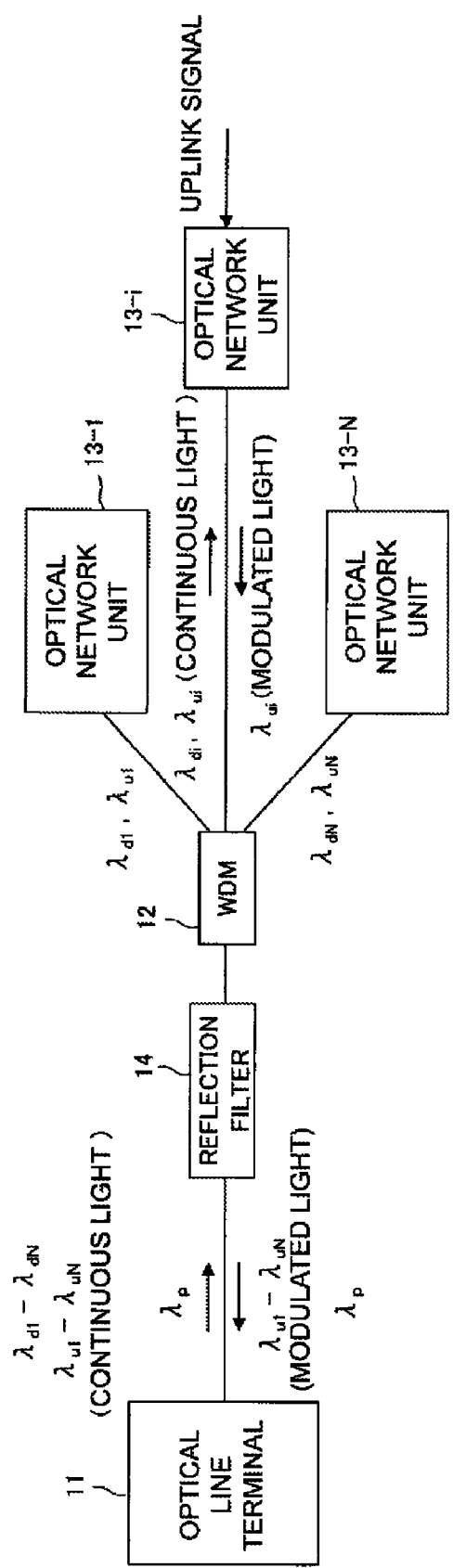
FIG. 1 is a schematic view illustrating a configuration of an optical transmission system using a Raman optical amplification according to an embodiment of the present invention.

FIG. 1 is a schematic view illustrating a configuration of an optical transmission system using Raman optical amplification according to an embodiment of the present invention. The optical transmission system using Raman optical amplification according to the embodiment is configured in a WDM-PON topology where a signal light between an optical line terminal 11 and each of optical network units 13-1, 13-N is multi/demultiplexed at a WDM 12. An AWG (arrayed waveguide grating) may be used for the WDM 12. Downlink signal lights having wavelengths $\lambda_{d1}, \ldots, \lambda_{dN}$ are transmitted from the optical line terminal 11 to the optical network units 13-1, . . . , 13-N through an optical fiber.

Figure 3:
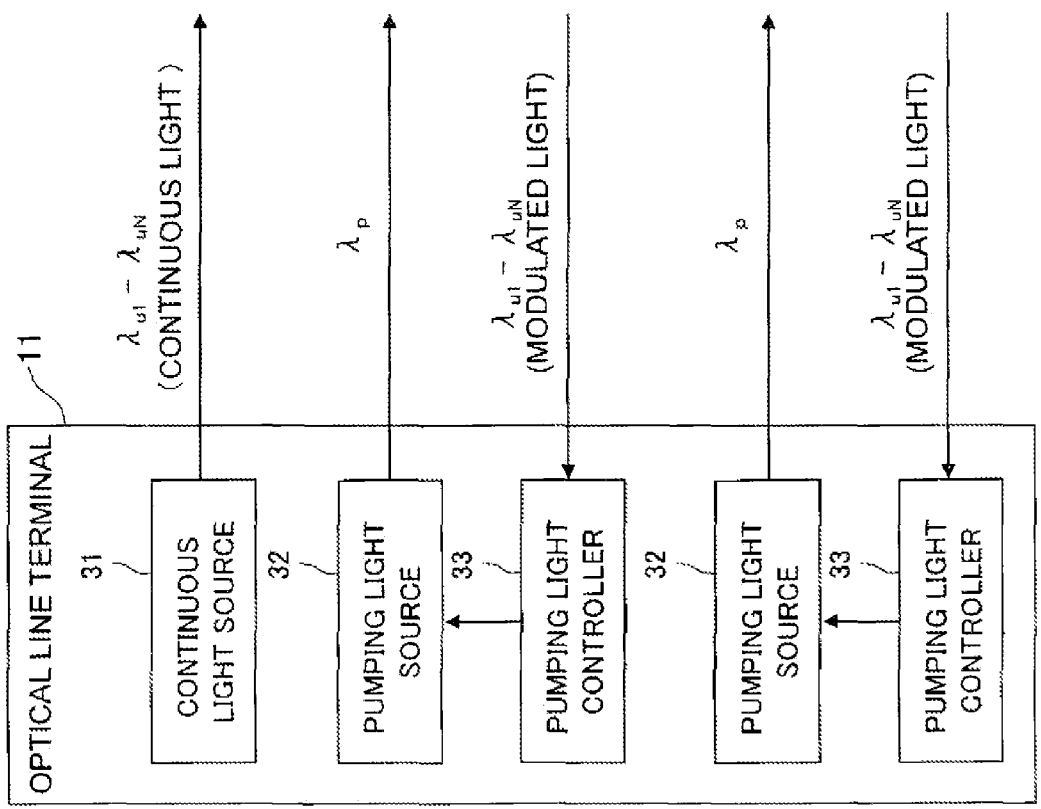
FIG. 3 is a diagram illustrating a makeup of the optical line terminal of FIG. 1.

The optical line terminal 11 includes a continuous light source 31, a pumping light source 32 and a pumping light controller 33 as shown in FIG. 3. The continuous light source supplies continuous lights having wavelengths $\lambda_{u1}, \ldots, \lambda_{uN}$ to the optical network units 13-1, . . . , 13-N through the optical line terminal 11 and an optical filter. The continuous lights are used for uplink signal. In addition, the pumping light source outputs to the optical filter a pumping light having a wavelength $\lambda_p$ which is used to excite lights of the continuous lights from the optical line terminal 11. Since intensities of the continuous lights are amplified through the Raman optical amplification, it is possible to compensate for insufficiency of the intensities of the uplink signal lights.

In the Raman optical amplification, a light having a predetermined wavelength difference from the wavelength $\lambda_p$ of the pumping light can be amplified. Therefore, the wavelength $\lambda_p$ of the pumping light is designed to be a wavelength having a predetermined wavelength difference from the wavelength $\lambda_{ui}$ of the amplified uplink signal light. For example, the predetermined wavelength difference may correspond to a frequency of about 12 THz, which is a case of a silica fiber.

The optical line terminal 11 preferably includes a plurality of the pumping light sources. By exciting the continuous lights with a plurality of the pumping lights supplied from the plurality of the pumping light sources, the intensities of the continuous lights can be amplified with a composition of amplification gains. For example, the optical line terminal 11 can supply the pumping lights by using pumping light sources for two wavelengths which can be used to amplify the wavelengths $\lambda_{ui}$, so that the wavelengths $\lambda_{ui}$ can be amplified with a composition of gains. As a result, even in a case where a distance from the optical line terminal 11 to each optical network unit 13-$i$ is long, the uplink signal lights can be transmitted with large intensities thereof to each optical network unit 13-$i$. On the contrary, even in a case where the distance from the optical line terminal 11 to each optical network unit 13-$i$ is short, the pumping lights having the wavelengths which can be used to amplify the wavelengths $\lambda_{ui}$ may not output to the optical fiber if the amplification of continuous lights is not needed.

In addition, the gain of the Raman optical amplification has a wavelength dependency. By combining the wavelengths of a plurality of the pumping lights supplied from a plurality of the pumping light sources, the amplification can be performed with the amplification characteristic suitable for the wavelength of each uplink signal light. Therefore, it is possible to supply the uplink signal light having the intensity suitable for the optical loss between each of the optical network units 13-1, . . . , 13-N and the optical line terminal 11. Accordingly, the amplification characteristic of each optical network unit can be adjusted by controlling wavelength allocation of the wavelengths of the uplink signal lights and the wavelengths of the pumping lights.

The optical line terminal 11 preferably further includes a pumping light controller which monitors the intensities of the uplink signal lights having the wavelengths $\lambda_{u1}, \ldots, \lambda_{uN}$ transmitted from the optical network units 13-1, . . . , 13-N and adjusts the wavelength $\lambda_p$ or intensity of the pumping light supplied from the optical line terminal 11 so that the intensities of the uplink signal lights become predetermined intensities. The pumping light controller monitors the intensities of the uplink signal lights having the wavelengths $\lambda_{u1}, \ldots, \lambda_{uN}$ transmitted from the optical network units 13-1, . . . , 13-N and adjusts the wavelength or intensity of the pumping light supplied from the pumping light source so that the intensities of the uplink signal lights become the predetermined intensities. By adjusting an amplification ratio of a continuous light, the intensities of the uplink signal lights can become the predetermined intensities.

For example, if the pumping light controller detects a decrease in the intensities of the uplink signal lights having the wavelengths $\lambda_{ui}$, the pumping light controller increases the intensity of the pumping light having the wavelength which is used to excite the lights having the wavelengths $\lambda_{ui}$. At this time, the wavelength of the pumping light may be the same as or different from the wavelength of the existing pumping light. If the wavelength of the pumping light is the same as the wavelength of the existing pumping light, the intensity of the pumping light is adjusted to be increased. If the wavelength of the pumping light is different from the wavelength of the existing pumping light, a pumping light source for different wavelength may be driven, or the wavelength of the existing pumping light may be controlled to be shifted. By shifting the wavelength of the existing pumping light, it is possible to increase the intensity of the pumping light which is used to excite the light having the desired wavelengths $\lambda_{ui}$ without an increase in the number of the pumping light sources.

Figure 2:
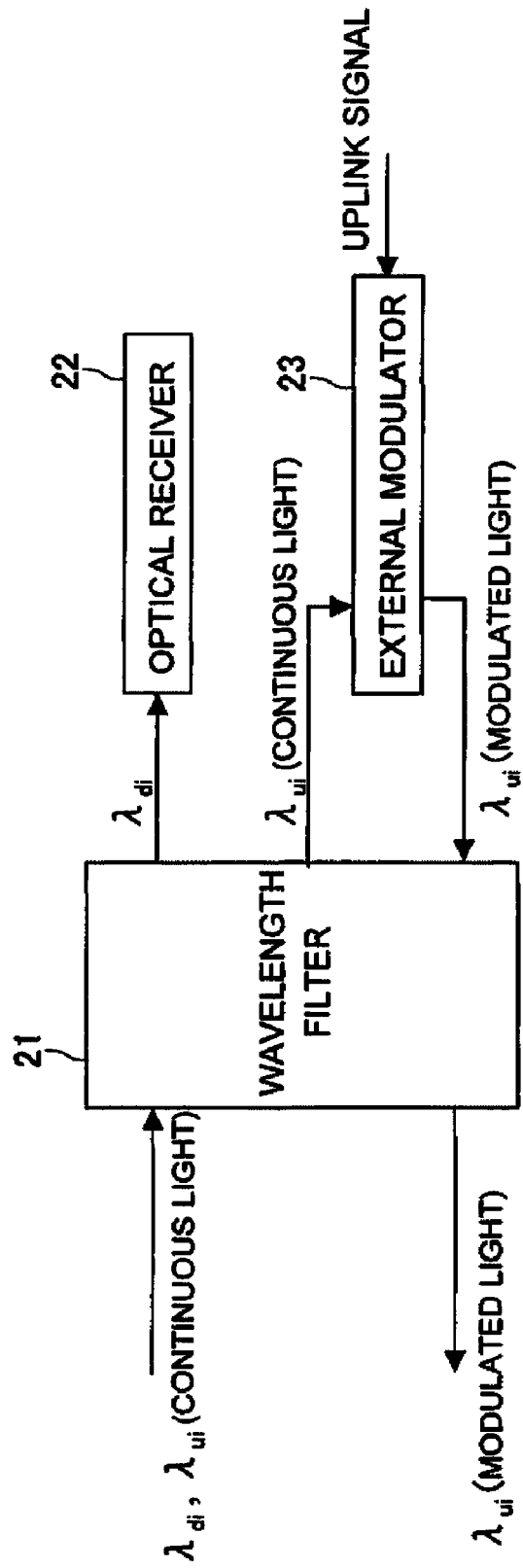
FIG. 2 is a pickup diagram illustrating an arbitrary optical network unit 13-$i$ among N optical network units 13-1, . . . , 13-N.

FIG. 2 is a pickup diagram illustrating an optical network unit. An arbitrary optical network unit 13-$i$ among the N optical network units 13-1, ..., 13-N shown in FIG. 1 includes a wavelength filter 21, an optical receiver 22, and an external modulator 23. The wavelength filter 21 demultiplexes and launches downlink signal lights having wavelengths $\lambda_{di}$ to the optical receiver 22. In addition, the wavelength filter 21 demultiplexes and launches continuous lights having wavelengths $\lambda_{ui}$ to the external modulator 23. The optical receiver 22 receives the downlink signal lights.

In the embodiment, transmission in each of the optical network units 13-1, ..., 13-N can be performed by using an optical fiber. In addition, the transmission may be performed by using two optical fibers. If the one optical fiber is used, it is possible to reduce cost. If the two optical fibers are used, one optical fiber is used for the uplink direction and another is used for the downlink direction. Separate optical fibers are used for the transmission of the downlink continuous lights having the wavelengths $\lambda_{ui}$ and the transmission of the uplink signal lights having the wavelengths $\lambda_{ui}$, so that it is possible to reduce an optical coupling loss in each of the optical network units 13-1, ..., 13-N.

In a case where the two optical fibers are used for each of the optical network units 13-1, ..., 13-N, an optical fiber or two optical fibers may be used for the transmission from the optical line terminal 11 to the WDM 12. If an optical fiber is used for the transmission from the optical line terminal 11 to the WDM 12, a common WDM can be used for both of the uplink and downlink directions. If two optical fibers are used for the transmission from the optical line terminal 11 to the WDM 12, different optical fibers can be used for the uplink and downlink directions. Separate optical fibers are used for the transmission of the downlink continuous lights having the wavelengths $\lambda_{ui}$ and the transmission of the uplink signal lights having the wavelengths $\lambda_{ui}$, so that it is possible to reduce an optical coupling loss in the optical line terminal 11.

The external modulator 23 modulates the continuous lights having the wavelengths $\lambda_{ui}$ transmitted from the wavelength filter 21 with an uplink signal and transmits the modulated light as the uplink signal light to the optical line terminal 11. As an example of the external modulator 23, there are used a waveguide type modulator such as an LN (lithium niobate) modulator and an LT (lithium tantalate) modulator and an electric field absorption type modulator such as an electroabsorption modulator. Due to the external modulator, the optical line terminal 11 shown in FIG. 1 can receive the uplink signal lights transmitted from the optical network units 13-$i$.

In some cases, a pumping light is not needed for each of the optical network units 13-1, ..., 13-N, and thus, a functional failure in communication may occur. Therefore, the optical transmission system using Raman optical amplification according to the embodiment shown in FIG. 1 preferably includes a reflection filter which is disposed between the optical line terminal 11 and the WDM 12 to reflect the pumping light transmitted from the optical line terminal 11. Due to the reflection filter, it is possible to prevent the functional failure in communication in the optical network units 13-1, ..., 13-N. In addition, the Raman optical amplification uses a property that the pumping light having the opposite direction as well as the pumping light having the same direction as the signal light is amplified, so that it is possible to improve the gain of the Raman optical amplification for the uplink direction by re-using the pumping light reflected by the reflection filter. In addition, if the wavelength of the pumping light is used as the wavelength available for the amplification of the downlink signal light, the Raman optical amplification for the downlink signal light can be implemented.

In the reflection filter, an FBG (Fiber Bragg Grating) is disposed between a WDM and a transmission optical fiber which is, for example, used for the WDM 12 to connect the optical line terminal 11. Due to the FBG, it is possible to implement an inexpensive system. For a case of changing the wavelengths or number of the pumping lights, it is preferable that the reflection wavelength of the reflection filter can be easily changed. For example, an optical fiber attached with the FBG is preferably used for the reflection filter.

According to the present invention, it is possible to configure high-speed optical transmission and flexible network. In particular, the present invention can be applied to a WDM-PON as one of the methods of configuring an optical access system.

What is claimed is:

1. An optical transmission system using Raman optical amplification, which is configured to include an optical line terminal, a plurality of optical network units connected to the optical line terminal through an optical fiber, and a WDM (wavelength division multiplexer) which multiplexes and demultiplexes signal lights between the optical line terminal and the optical network units in a WDM-PON (passive optical network) topology, wherein the optical line terminal comprises:
a continuous light source which supplies to the optical network units through the optical fiber, continuous lights having the same wavelengths as uplink signal lights from the optical network units to the optical line terminal; and
a pumping light source which supplies to the optical fiber, pumping lights which are used to excite the continuous lights from the continuous light source, and
wherein each of the optical network units comprises an external modulator which modulates the continuous lights from the optical line terminal and outputs the modulated continuous lights as the uplink signal lights to the optical line terminal.

2. The optical transmission system using Raman optical amplification according to claim 1, further comprising a reflection filter which is disposed between the optical line terminal and the WDM to reflect the pumping light transmitted from the optical line terminal.

3. The optical transmission system using Raman optical amplification according to claim 2,
wherein the optical line terminal comprises a plurality of the pumping light sources, and
wherein each of the pumping light sources supplies to the optical fiber the pumping light which are used to excite the continuous lights from the continuous light source.

4. The optical transmission system using Raman optical amplification according to claim 3, wherein the optical line terminal further comprises a pumping light controller which monitors the intensities of the uplink signal lights transmitted from the optical network unit and controls the wavelengths or intensities of the pumping lights supplied by the pumping light source so that the intensities of the uplink signal lights become predetermined intensities.

5. The optical transmission system using Raman optical amplification according to claim 1,
wherein the optical line terminal comprises a plurality of the pumping light sources, and wherein each of the pumping light sources supplies to the optical fiber the pumping light which are used to excite the continuous lights from the continuous light source.

6. The optical transmission system using Raman optical amplification according to claim 1, wherein the optical line terminal further comprises a pumping light controller which monitors the intensities of the uplink signal lights transmitted from the optical network unit and controls the wavelengths or intensities of the pumping lights supplied by the pumping light source so that the intensities of the uplink signal lights become predetermined intensities.

7. The optical transmission system using Raman optical amplification according to claim 2, wherein the optical line terminal further comprises a pumping light controller which monitors the intensities of the uplink signal lights transmitted from the optical network unit and controls the wavelengths or intensities of the pumping lights supplied by the pumping light source so that the intensities of the uplink signal lights become predetermined intensities.

8. The optical transmission system using Raman optical amplification according to claim 5, wherein the optical line terminal further comprises a pumping light controller which monitors the intensities of the uplink signal lights transmitted from the optical network unit and controls the wavelengths or intensities of the pumping lights supplied by the pumping light source so that the intensities of the uplink signal lights become predetermined intensities.

* * * * *